(12) United States Patent
Röhm

(10) Patent No.: US 6,568,889 B2
(45) Date of Patent: May 27, 2003

(54) COLLET CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/990,240

(22) Filed: Nov. 21, 2001

(65) Prior Publication Data

US 2002/0063399 A1 May 30, 2002

(30) Foreign Application Priority Data

Nov. 29, 2000 (DE) .......................................... 100 59 209

(51) Int. Cl.[7] ................................................. B23C 5/26
(52) U.S. Cl. ........................ 409/233; 279/2.02; 82/160; 409/234
(58) Field of Search ............................... 279/2.02, 2.03, 279/2.14, 2.15, 2.24, 141; 408/239 R, 239 A, 240; 82/160, 169; 269/48.1; 409/232–234; 294/86.24, 86.25, 93

(56) References Cited

U.S. PATENT DOCUMENTS

| 4,135,848 | A | * | 1/1979 | Hughes et al. | 408/239 A |
|---|---|---|---|---|---|
| 4,844,671 | A | * | 7/1989 | Reinauer | 409/233 |
| 4,997,325 | A | * | 3/1991 | Heel et al. | 409/233 |
| 5,346,344 | A | * | 9/1994 | Kress et al. | 409/234 |
| 5,851,093 | A | * | 12/1998 | Erickson | 409/234 |
| 5,865,578 | A | * | 2/1999 | Benedikter et al. | 409/233 |
| 6,309,150 | B1 | * | 10/2001 | Hangleiter | 409/233 |
| 6,419,430 | B2 | * | 7/2002 | Hangleiter | 409/233 |

FOREIGN PATENT DOCUMENTS

DE               274178 A1 * 12/1989 .................. 409/232

* cited by examiner

*Primary Examiner*—Steven C. Bishop
(74) *Attorney, Agent, or Firm*—Herbert Dubno; Andrew Wilford

(57) ABSTRACT

A collet chuck for holding a mounting collar of an object to be rotated has a chuck body centered on and rotatable about an axis and formed with an axially forwardly open socket shaped to receive the collar. A plurality of jaws in the socket have front ends engageable inside the collar in the socket and each formed with a radially inwardly directed planar front face. A setting sleeve has a front cam surface formed with respective planar radially outwardly directed front facets engageable with the front faces of the jaws so that the sleeve can cam out the front ends to lock the jaws to the collar in the socket.

14 Claims, 4 Drawing Sheets

COLLET CHUCK

FIELD OF THE INVENTION

The present invention relates to a chuck. More particularly this invention concerns a collet chuck for attachment to a mounting collar of a tool or of a workpiece to be machined.

BACKGROUND OF THE INVENTION

A standard collet chuck for attachment to a mounting collar of a tool or workpiece has a body formed centered on an axis with a forwardly open socket shaped to coaxially receive the mounting collar. A collet inside the body has a plurality of jaws with front ends that project axially forward into the collar. The jaws can rock to move the front ends radially outward to engage behind an axially forwardly directed shoulder of the collar and thereby lock the collar to the chuck body. Each jaw can pivot in the body about a respective axis extending in a plane perpendicular to the axis and offset therefrom. An axially displaceable cam sleeve inside the body has a radially outwardly directed front cam surface engageable with front inner faces of the front ends of the jaws and a radially outwardly directed rear cam surface engageable with rear inner faces of rear ends of the jaws. Thus, when displaced axially rearward, the cam sleeve spreads the front ends of the jaws to hold the workpiece and, when displaced axially forward, rocks these front ends inward to release the workpiece.

In copending application Ser. No. 09/930,922 such a chuck is described which has, in order to maintain the jaws at a perfect angular equispacing to eliminate vibration and throw on high-speed rotation, radially outwardly projecting and axially extending ribs extending from the setting sleeve and each received in a respective one of the slots between the jaws. Thus the jaws are positively held at the necessary spacing so they will move only radially. This system works fairly well, but the setting sleeve is somewhat difficult to manufacture and to fit together with the jaws to form the collet subassembly.

OBJECTS OF THE INVENTION

It is therefore an object of the present invention to provide an improved collet chuck.

Another object is the provision of such an improved collet chuck which overcomes the above-given disadvantages, that is which can operate at very high rotation speeds without vibration and which is of simple and inexpensive construction.

SUMMARY OF THE INVENTION

A collet chuck for holding a mounting collar of an object to be rotated has according to the invention a chuck body centered on and rotatable about an axis and formed with an axially forwardly open socket shaped to receive the collar. A plurality of jaws in the socket have front ends engageable inside the collar in the socket and each formed with a radially inwardly directed planar front face. The jaws are angularly spaced and defining axially extending and radially inwardly open slots. A setting sleeve has a front cam surface formed with respective planar radially outwardly directed front facets engageable with the front faces of the jaws so that the sleeve can cam out the front ends to lock the jaws to the collar in the socket.

Thus with this system the planar engagement of the angularly equispaced facets of the setting sleeve that occurs each time the chuck is clamped to a workpiece or tool automatically angularly positions the jaws perfectly. In addition the surface contact ensures good force transmission and low wear.

In accordance with the invention the chuck body is formed axially rearward of the socket with a radially inwardly open groove centered on the axis and each jaw has a rear end received and radially displaceable in the groove and formed with a radially inwardly directed planar rear face. The setting sleeve has respective planar radially outwardly directed rear facets engageable with the rear faces of the rear ends of the jaws so that the sleeve can cam out the rear ends to move the front ends radially inward and axially clear of the collar in the socket.

The ribs in accordance with the invention are of an angular dimension increasing outward from the axis. In addition a spring engaged around the rear ends of the jaws urges the jaw front ends radially outward. The rear ends form a radially outwardly open groove receiving the spring and the spring has spacer blocks engaged between the jaws and braced angularly against the jaws so that the spacer blocks angularly space and separate the jaws. Thus prior to assembly of the chuck, the spring holds the jaws at the desired angular spacing.

The sleeve according to the invention is formed axially rearward of the rear cam surface with respective planar rearmost facets extending parallel to the axis and engageable with the jaw rear ends to retain same in a freeing position with the jaw front ends shifted inward. Thus when the sleeve is shifted far enough forward to engage these rearmost facets against the rear inner faces of the jaws, the chuck will hold in this position.

The groove has an axially rearwardly directed flank engaging the jaw rear ends. This flank has a radially outer portion lying substantially in a plane perpendicular to the axis and a frustoconical radially inner portion inclined at about 10° to the plane. This facilitates rocking of the jaws and assembly of the device.

The mounting collar in accordance with the invention has an axially forwardly directed shoulder and the jaw front ends each have an axially rearwardly directed shoulder engageable axially with the collar shoulder.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
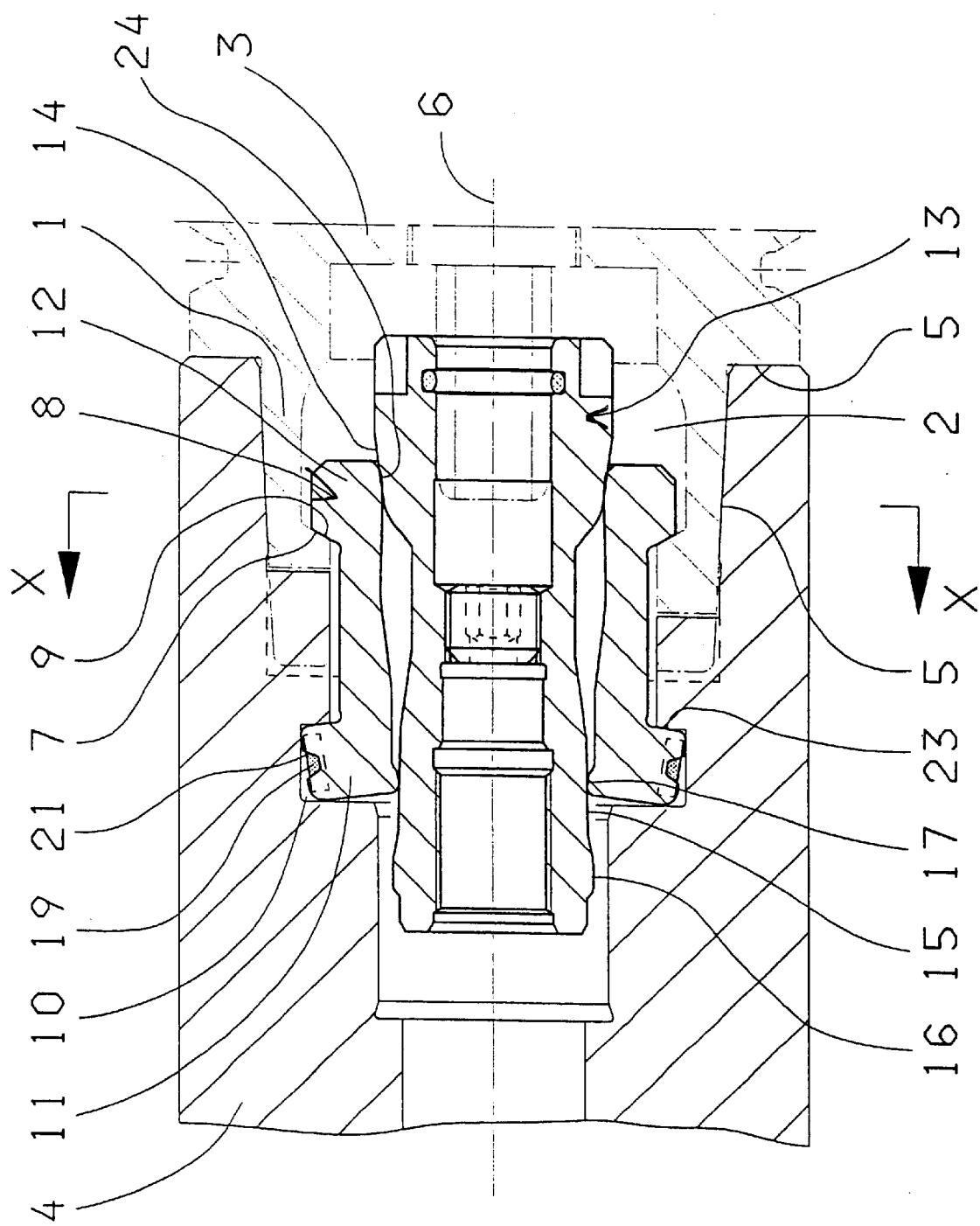
FIG. 1 is an axial section through the collet chuck according to the invention.

As seen in FIG. 1 a collet chuck according to the invention is centered on an axis 6 and adapted to hold a work-piece 3 having a mounting collar 1 in turn having annularly planar and frustoconical surfaces 5 centered on the axis 6 and engaging complementary surfaces of a socket 2 of a sleeve-like chuck body 4 centered on and rotatable about the axis 6. The collar 1 also has an axially forwardly (to the right in FIG. 1) directed shoulder surface 7.

Figure 3:
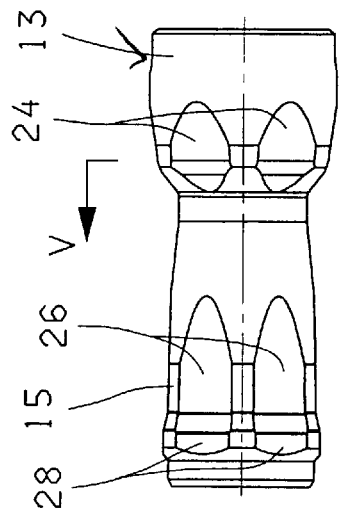
FIGS. 3 and 4 are side views of the setting sleeve.
Figure 4:
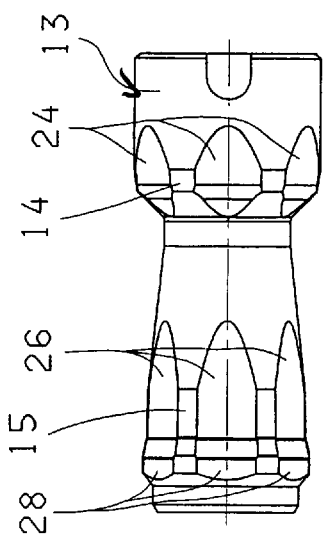
Figure 5:
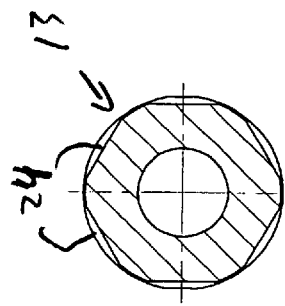
FIG. 5 is a section taken along line V—V of FIG. 3.
Figure 2:
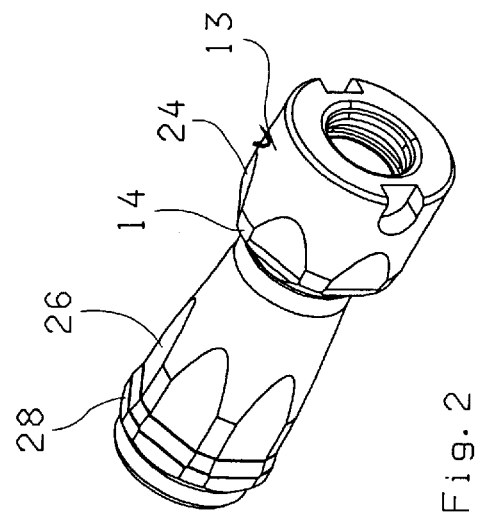
FIG. 2 is a perspective view of the setting sleeve in accordance with the invention.
Figure 7:
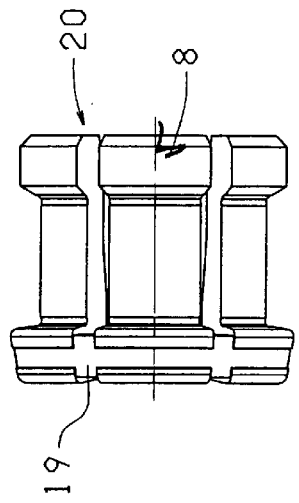
FIG. 7 is a side view of the collet.
Figure 8:
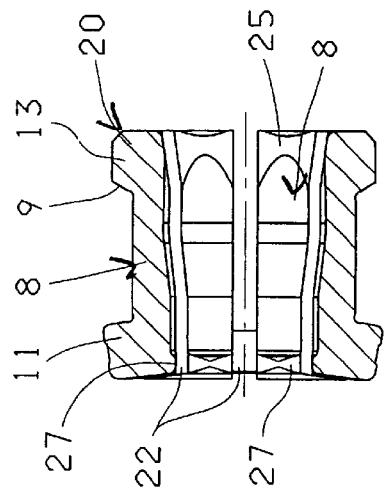
FIG. 8 is an axial section through the collet.
Figure 9:
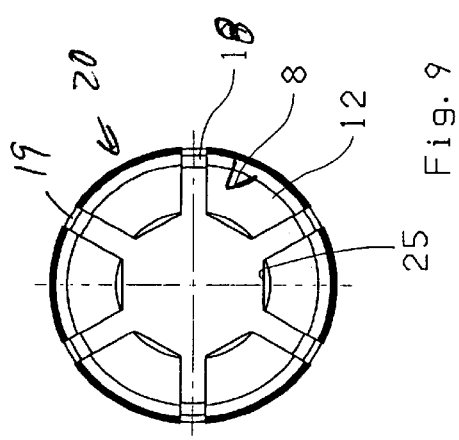
FIG. 9 is an end view of the collet.
Figure 6:
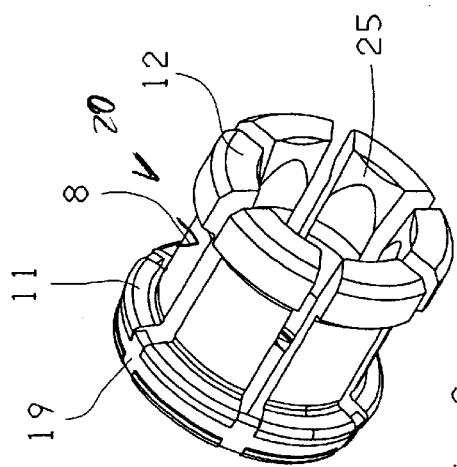
FIG. 6 is a perspective view of the collet.
Figure 11:
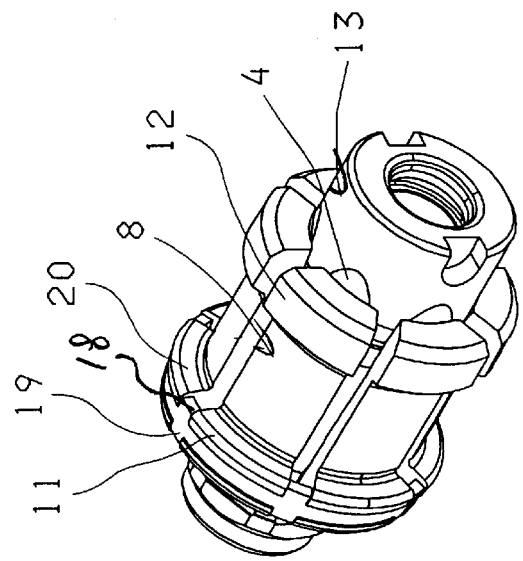
FIG. 11 is a perspective view of the collet and setting-sleeve subassembly.
Figure 10:
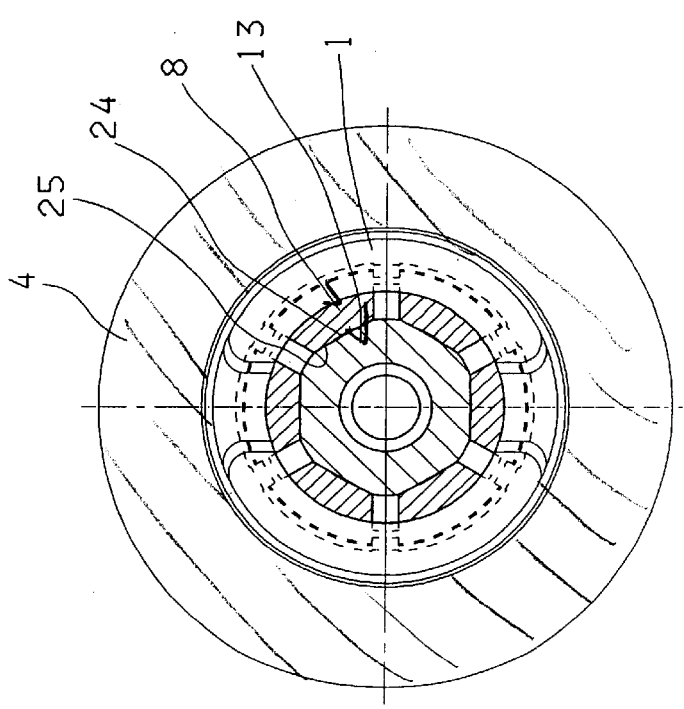
FIG. 10 is a section taken along line X—X of FIG. 1, with the object being chucked removed for clarity of view.

As also shown in FIGS. 6 through 11 a collet assembly 20 comprised of six identical jaws 8 (FIGS. 3 and 4) is provided inside the tubular body 4, although seven or another number of jaws 8 would be possible. Each jaw 8 has a front end 12 with an axially rearwardly directed shoulder surface 9 engageable with the shoulder 7 and a rear end 11 received in a radially inwardly open groove 10 centered on the axis 6. The jaws 8 can rock about respective axes lying in a plane perpendicular to the axis 6 between the illustrated holding position with the outer ends 12 in radial outer positions and the shoulders 9 engaging the shoulder 7 and an unillustrated freeing position with the outer ends 12 in radial inner positions and the mounting collar 1 free to move axially back (toward the left in FIG. 1) into and forward out of the chuck body 4. During such rocking the rear ends 11 of the jaws 8 move radially oppositely to the front ends 12.

A spring element 19 is set in radially outwardly open notches 21 of the rear ends 11 to urge the collet assembly 8 into the holding position with the front ends 12 spread. The jaws 8 are angularly spaced to form axially extending and radially throughgoing slots or gaps 22 with radially outwardly flared outer portions. The spring element 19 is an elastomeric ring and is formed with spacer blocks 18 that engage in the slots 22 and maintain a uniform spacing between adjacent jaws 8. This is particularly helpful prior to assembly of the device to keep the jaws 8 in the intended positions.

A position-setting collar 13 is axially displaceable by an unillustrated actuator in the chuck body 4 and has a frustoconical front surface 14 engageable with the front ends 12 and a frustoconical rear surface 15 engageable with the rear ends 11. Thus when the sleeve 13 is pulled axially backward (to the left in FIG. 1), it will push the front jaw ends 12 radially outward to lock the chuck body 4 to the workpiece 3, and when pushed axially forward (to the right in FIG. 1), it will push the rear jaw ends 11 radially outward to release the workpiece 3. The sleeve 13 has a radially outwardly directed rearmost cylindrical ridge 16 engageable with bumps 17 of the jaws 8 to hold them in the freeing position. The groove 21 has a front flank 23 with an outer half lying in a plane perpendicular to the axis 6 and an inner half of frustoconical shape extending at 10° to the outer portion and flaring axially rearward.

In accordance with the invention the surface 14 is actually formed by respective planar faces or facets 24 that engage complementary planar faces 25 (FIG. 10) of the jaws 8. Similarly the surface 15 is formed with respective planar faces or facets 26 that engage complementary planar faces 27 (FIG. 8) of the jaws 8. Finally the ridge 16 has planar faces or facets 28 forming extensions of the facets 26, extending parallel to the axis 6, and also engageable with the surfaces 27. Hence the jaws 8 will bear in surface, not point, contact on the sleeve 13 for excellent force transmission and reduced wear. In addition the interfit of the planar surfaces 24–28 will keep the jaws 8 distributed angularly uniformly about the axis 6.

I claim:

1. A collet chuck for holding a mounting collar of an object to be rotated, the chuck comprising:
   a chuck body centered on and rotatable about an axis and formed with an axially forwardly open socket shaped to receive the collar;
   a plurality of jaws in the socket having front ends engageable inside the collar in the socket and each formed with a radially inwardly directed planar front face, the jaws being angularly spaced and separated by open slots, whereby the jaws can move angularly in the body; and
   a setting sleeve having a frustoconical front cam surface centered on the axis and formed with respective planar radially outwardly directed front facets radially confronting and engageable with the front faces of the jaws, whereby the sleeve can cam out the front ends to lock the jaws to the collar in the socket.

2. The collet chuck defined in claim 1 wherein the chuck body is formed axially rearward of the socket with a radially inwardly open groove centered on the axis and each jaw has a rear end received and radially displaceable in the groove and formed with a radially inwardly directed planar rear face, the setting sleeve having respective planar radially outwardly directed rear facets engageable with the rear faces of the jaws, whereby the sleeve can cam out the rear ends to move the front ends radially inward and axially clear of the collar in the socket.

3. The collet chuck defined in claim 2, further comprising
   means including a spring engaged around the rear ends of the jaws for urging the jaw front ends radially outward.

4. The collet chuck defined in claim 3 wherein the rear ends form a radially outwardly open groove receiving the spring.

5. The collet chuck defined in claim 4 wherein the jaws define axially extending and radially inwardly open slots and the spring has spacer blocks engaged in the slots and braced angularly against the jaws, whereby the spacer blocks angularly space and separate the jaws.

6. The collet chuck defined in claim 2 wherein the sleeve is formed axially rearward of the rear cam surface with respective planar rearmost facets extending parallel to the axis and engageable with the jaw rear ends to retain same in a freeing position with the jaw front ends shifted inward.

7. The collet chuck defined in claim 2 wherein the groove has an axially rearwardly directed flank engaging the jaw rear ends.

8. The collet chuck defined in claim 7 wherein the flank has a radially outer portion lying substantially in a plane perpendicular to the axis and a frustoconical radially inner portion inclined at about 10° to the plane.

9. The collet chuck defined in claim 2 wherein the mounting collar has an axially forwardly directed shoulder and the jaw front ends each have an axially rearwardly directed shoulder engageable axially with the collar shoulder.

10. A collet chuck for holding a mounting collar of an object to be rotated, the chuck comprising:
    a chuck body centered on and rotatable about an axis and formed with
      an axially forwardly open socket shaped to receive the collar and
      a radially inwardly open groove centered on the axis rearward of the socket;
    a plurality of angularly spaced jaws in the socket having front ends engageable inside the collar in the socket and each formed with a radially inwardly directed planar front face and
      rear ends received and radially displaceable in the groove and each formed with aa radially inwardly directed planar rear face;
    a setting sleeve having a front cam surface formed with respective planar radially outwardly directed front facets engageable with the front faces of the jaws and respective planar radially outwardly directed rear facets engageable with the rear faces of the jaws, whereby the sleeve can cam out the front ends to lock the jaws to the collar in the socket and the sleeve can cam out the rear ends to move the front ends radially inward and axially clear of the collar in the socket; and means including a spring engaged around the rear ends of the jaws for urging the jaw front ends radially outward.

11. The collet chuck defined in claim 10 wherein the rear ends form a radially outwardly open groove receiving the spring.

12. The collet chuck defined in claim 11 wherein the jaws define axially extending and radially inwardly open slots and the spring has spacer blocks engaged in the slots and braced angularly against the jaws, whereby the spacer blocks angularly space and separate the jaws.

13. A collet chuck for holding a mounting collar of an object to be rotated, the chuck comprising:

a chuck body centered on and rotatable about an axis and formed with
an axially forwardly open socket shaped to receive the collar and
a radially inwardly open groove centered on the axis rearward of the socket;

a plurality of angularly spaced jaws in the socket having
front ends engageable inside the collar in the socket and each formed with a radially inwardly directed planar front face and
rear ends received and radially displaceable in the groove and each formed with aa radially inwardly directed planar rear face; and a setting sleeve having
a front cam surface formed with respective planar radially outwardly directed front facets engageable with the front faces of the jaws,
respective planar radially outwardly directed rear facets engageable with the rear faces of the jaws, whereby the sleeve can cam out the front ends to lock the jaws to the collar in the socket and the sleeve can cam out the rear ends to move the front ends radially inward and axially clear of the collar in the socket, and respective planar rearmost facets axially rearward of the rear cam surface, extending parallel to the axis, and engageable with the jaw rear ends to retain same in a freeing position with the jaw front ends shifted inward.

14. A collet chuck for holding a mounting collar of an object to be rotated, the chuck comprising:

a chuck body centered on and rotatable about an axis and formed with
an axially forwardly open socket shaped to receive the collar and
a radially inwardly open groove centered on the axis rearward of the socket and having an axially rearwardly directed flank engaging the jaw rear ends and in turn having a radially outer portion lying substantially in a plane perpendicular to the axis and a frustoconical radially inner portion inclined at about 10° to the plane;

a plurality of angularly spaced jaws in the socket having
front ends engageable inside the collar in the socket and each formed with a radially inwardly directed planar front face and
rear ends received and radially displaceable in the groove and each formed with aa radially inwardly directed planar rear face; and a setting sleeve having
a front cam surface formed with respective planar radially outwardly directed front facets engageable with the front faces of the jaws and
respective planar radially outwardly directed rear facets engageable with the rear faces of the jaws, whereby the sleeve can cam out the front ends to lock the jaws to the collar in the socket and the sleeve can cam out the rear ends to move the front ends radially inward and axially clear of the collar in the socket.

* * * * *